US005226936A

United States Patent [19]

Garkawe

[11] Patent Number: 5,226,936

[45] Date of Patent: Jul. 13, 1993

[54] WATER-COOLED CYCLONE SEPARATOR

[75] Inventor: Michael Garkawe, Madison, N.J.

[73] Assignee: Foster Wheeler Energy Corporation, Clinton, N.J.

[21] Appl. No.: 970,590

[22] Filed: Oct. 29, 1992

Related U.S. Application Data

[63] Continuation of Ser. No. 797,510, Nov. 21, 1991, abandoned.

[51] Int. Cl.[5] .............................................. B01D 53/24

[52] U.S. Cl. ...................................... 55/269; 55/459.1

[58] Field of Search ........................ 55/269, 435, 459.1

[56] References Cited

U.S. PATENT DOCUMENTS 4,275,668 6/1981 Daman .
4,521,976 6/1985 Stewart et al. .
4,597,774 6/1986 Garcia-Mallol et al. .
4,598,670 7/1986 Clamser et al. .
4,615,715 10/1986 Seshamani ............................ 55/269
4,694,758 9/1987 Gorzegno et al. .
4,746,337 5/1988 Magol et al. .......................... 55/269
4,809,625 3/1989 Garcia-Mallol et al. .
4,896,717 1/1990 Campbell, Jr. et al. .
4,913,711 4/1990 Stewart ................................ 55/269
4,944,250 7/1990 Seshamani .
4,961,761 10/1990 Johnson ............................... 55/269

*Primary Examiner*—Charles Hart
*Attorney, Agent, or Firm*—Marvin A. Naigur

[57] ABSTRACT

A cyclone separator formed by a plurality of parallel tubes and a plurality of fins. Each tube is configured in a multitude of segments. One segment of the tubes forms a cylindrical section, one segment is bent inwardly to form a roof section, and one segment is bent inwardly to form a conically-shaped hopper section. As the circumference and diameter of the hopper section decreases from top to bottom, at least a portion of the tubes are configured, either by being extracted or swaged, to accommodate the decreasing circumference and diameter, which results in an increase in the heat recovery of the water-cooled heat transfer tubes without the need for an intermediate ring header.

23 Claims, 2 Drawing Sheets

WATER-COOLED CYCLONE SEPARATOR

This is a continuation of co-pending application Ser. No. 07/797,510 filed on Nov. 21, 1991 now abandoned.

BACKGROUND OF THE INVENTION

This invention relates to a cyclone separator and, more particularly, to a cyclone separator in which the heat exchange portion of the hopper section of such separator is extended.

Fluidized bed reactors, combusters, or gasifiers are well known. In these arrangements, air is passed through a bed of particulate materials, including a fossil fuel such as coal and an adsorbent for the sulfur generated as a result of combustion of the coal, to fluidize the bed and to promote the combustion of the fuel at a relatively low temperature. When the heat produced by the fluidized bed is utilized to convert water to steam, such as in a steam generator, the fluidized bed system offers an attractive combination of high heat release, high sulfur adsorption, low nitrogen oxide emissions, and fuel flexibility.

The most typical fluidized bed combustion system is commonly referred to as a bubbling fluidized bed in which a bed of particulate materials is supported by an air distribution plate, to which combustion-supporting air is introduced through a plurality of perforations in the plate, causing the material to expand and to take on a suspended, or fluidized state. In the event the reactor is in the form of a steam generator, the walls of the reactor are formed by a plurality of water-cooled heat transfer tubes. The heat produced by a combustion within the fluidized bed is transferred to a heat exchange medium, such as water, steam, or a combination thereof, circulating through the tubes. The tubes are usually connected to a natural water circulation circuitry, including a steam drum, for separating water from the steam thus formed which is routed to a turbine to generate electricity or to a steam user. The tubes eliminate the need for expensive, high temperature refractory-lined duct work and expansion joints.

Fluidized bed combustion systems of this type include a cyclone separator which is normally situated to receive the gaseous discharge from the bubbling fluidized bed. The material introduced into the separator contains gases with solid fuel particles entrained. The separator utilizes centrifugal forces to separate the solid particles from the gases.

Cyclone separators for separating solid fuel particles and gases discharged from a combustion system or the like are normally provided with a hopper section in the lower end to collect the solid fuel particles. U.S. Pat. No. 4,944,250 discloses an improved cyclone separator having walls constructed of water-cooled heat transfer tubes. The addition of the tubes minimizes the need for expensive, high temperature refractory-lined duct work and expansion joints between the reactor and the cyclone separator, and between the cyclone separator and heat recovery section. The walls of the separator are constructed of constant diameter tubes connected together by fins. Each fin extends from one tube and is welded to an adjacent tube, thus creating a gas-tight wall. In this design the hopper section of the separator is conically-shaped, with the circumference and diameter of the hopper section decreasing from top to bottom. Thus, while the circumference of the hopper section decreases, the diameters of the tubes in the walls remain constant. To accommodate the decreasing circumference, the size of the fins connecting the tubes in the walls is gradually decreased from top to bottom. The problem arises when the size of the fins connecting the tubes is no longer able to be reduced because the tubes are touching one another with no room for a fin. As this problem occurs at some area above the bottom of the hopper section, the tubes cannot extend the full length of the hopper section.

One solution to this problem is to introduce an intermediate ring header, which reduces the number of tubes extending between the intermediate ring header and the lower ring header and thus enables the tubes to extend the full length of the hopper section. However, the addition of the intermediate ring header increases the cost of the system.

SUMMARY OF INVENTION

It is therefore an object of the present invention to provide a cyclone separator of the above type in which the water-cooled heat transfer tubes extend the full length of the hopper section.

It is further object of the present invention to provide a cyclone separator of the above type in which the need for an intermediate ring header is eliminated.

It is a further object of the present invention to provide a cyclone separator of the above type in which heat recovery is increased.

Toward the fulfillment of these and other objects, the separator of the present invention includes a cylindrical section, a roof section, and a hopper section, all of which are formed by a plurality of water-cooled heat transfer tubes extending in parallel relationship. Two ring headers are provided, one at the top and one at the bottom of the separator, to pass the cooling water, steam, or a combination thereof, through the tubes. An inner barrel is provided to define, in combination with the cylindrical section of the separator, an annular chamber which receives a mixture of gases and solid particles for separating the solid particles from the gases by centrifugal forces. As the separation takes place, the solid particles fall into the hopper section of the separator for disposal, or recycle, and the gases pass upwardly through the inner barrel of the separator to external heat recovery equipment. According to a main feature of the present invention, the extension of the water-cooled tube walls over the entire length of the hopper section is accomplished either by decreasing the size of the tubes or by decreasing the number of tubes, neither of which gives rise to the need for an intermediate ring header. Thus, either embodiment can be incorporated into a natural circulation or pump system.

BRIEF DESCRIPTION OF THE DRAWINGS

The above brief description, as well as further objects, features, and advantages of the present invention will be more fully appreciated by reference to the following detailed description of the presently preferred, but nonetheless illustrative embodiments in accordance with the present invention when taken in conjunction with the accompanying drawings in which.

DESCRIPTION OF THE PREFERRED EMBODIMENTS

Figure 1:
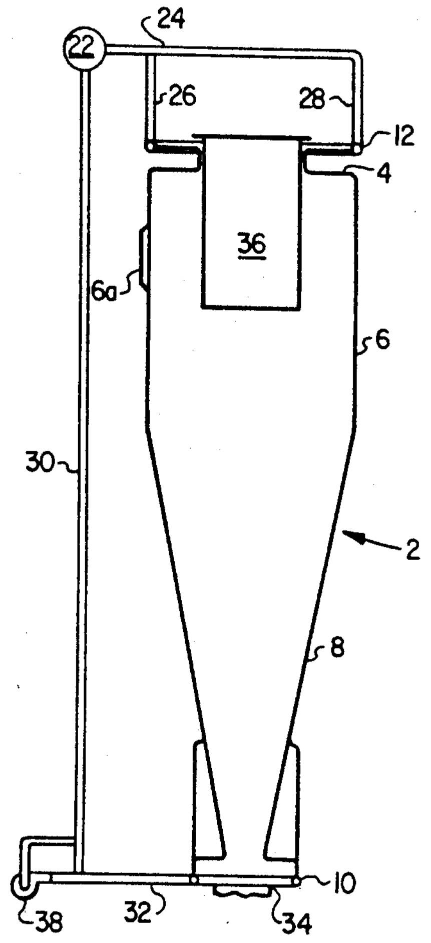
FIG. 1 is a schematic view of the cyclone separator of the present invention including a water circulation system.

Referring to FIG. 1 of the drawings, the reference numeral 2 refers in general to the cyclone separator of the present invention which includes a roof section 4, a cylindrical section 6 with an inlet opening 6a, and a conically-shaped hopper section 8. A lower ring header 10 is disposed at the lower end of the hopper section 8 and an upper ring header 12 is disposed at the upper end of the roof section 4. The roof section 4 is connected to an inner barrel 13 in a conventional manner such as welding. The connection of the inner barrel 13 and the roof section 4 is gas-tight. The inner barrel 13 is aligned in a coaxial relationship with the cylindrical section 6. The lower portion of the inner barrel 13 extends into the cylindrical section 6. The upper portion of inner barrel 13 extends beyond the cyclone separator 2.

Figure 2:
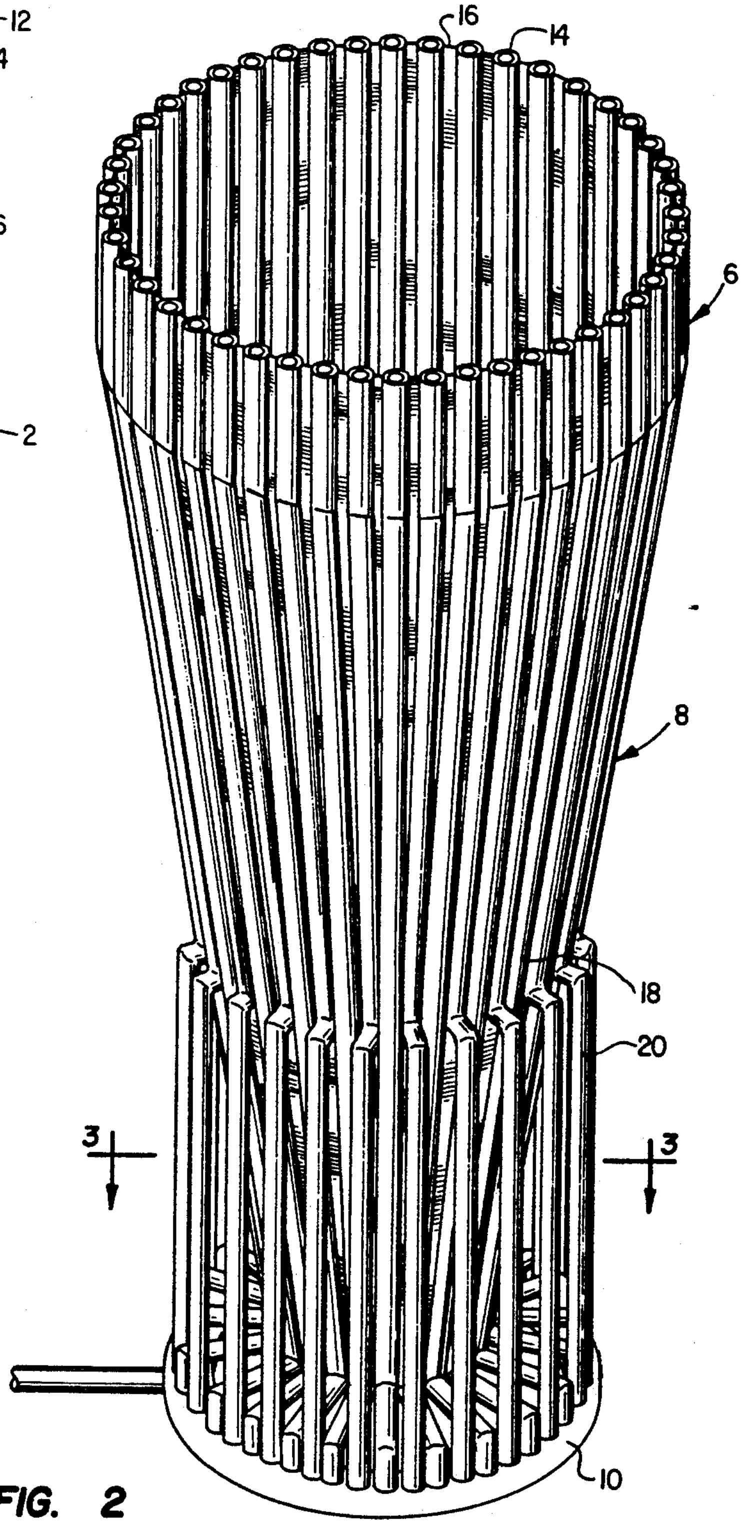
FIG. 2 is a enlarged perspective view of a portion of the separator of the present invention.

As better shown in FIG. 2, the cylindrical section 6 and the hopper section 8 are formed by a group of continuous, spaced, constant diameter, parallel tubes 14. The tubes 14 are connected at their lower ends to the lower ring header 10 and span the entire length of the separator. Although the upper portion of the cylindrical section 6 is not shown in FIG. 2, it is understood that the remainder of cylindrical section 6 and the roof section 4 are also formed by the same group of tubes 14. A portion of the tubes 14 are bent away from the plane of cylindrical section 6 to form the inlet opening 6a (FIG. 1), which enables the gases containing the solid particles to be introduced into the annular chamber in a tangential direction.

The tubes 14 are spaced apart by a plurality of fins 16 extending from diametrically opposed portions of each tube for the entire length of the tubes and connected to the tubes in any conventional manner, such as welding, to render the separator 2 gas-tight. The width of each fin 16 is constant in the cylindrical section 6, with the exception of the inlet opening 6a, and varies in the roof section 4 and the hopper section 8 as will be described.

As shown in FIG. 1, the tubes 14 extend generally horizontally from the upper ring header 12 in an inwardly direction and are then bent downwardly in a vertical direction. The tubes 14 are then bent outwardly in a generally horizontal direction to complete the roof section 4 and are then bent downwardly in a vertical direction to form the cylindrical section 6. At the lower portion of the cylindrical section the tubes 14 are bent inwardly at a slight angle to form the conically-shaped hopper section 8.

The inlet opening 6a, roof section 4, and cylindrical section 6 are all described in detail in U.S. Pat. No. 4,746,337, which is assigned to the assignee of the present invention, the disclosure of which is incorporated by reference for all purposes.

As shown in FIG. 2, the width of fins 16 necessarily decreases from the top to the bottom of conically-shaped hopper section 8, until the tubes 14 are in direct contact with one another, which negates the need for a fin. To accommodate the decreasing circumference and diameter of the hopper section 8, the tubes 14 are divided into two sets 14a and 14b. The tubes forming the set 14a extend the entire length of the hopper section 8 and are then bent radially outwardly and then downwardly into the lower ring header 10. The tubes forming the set 14b extend some distance down the hopper section 8 before being extracted, or bent radially outwardly, and are then bent downwardly toward the lower ring header 10. The lengths of both sets of tubes 14a and 14b are approximately equal from the upper ring header 12 to the lower ring header 10.

Figure 3:
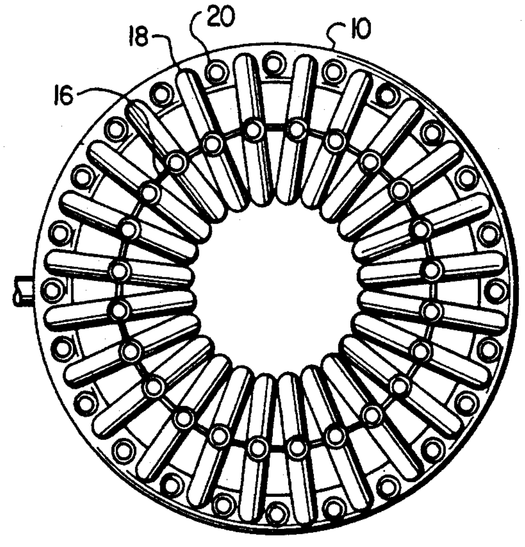
FIG. 3 is a cross-sectional view taken along the line 3—3 of FIG. 2.

As shown in FIG. 3, the lower portion of the hopper section 8 is formed exclusively by the tubes of the set 14a, in combination with the fins 16. The tubes of the set 14a are bent radially outwardly at the bottom of the hopper section 8 and downwardly into the lower ring header 10. The tubes of the set 14b, which have been extracted above this view, extend vertically into the lower ring header 10.

FIG. 1 depicts the circulation system utilized with the separator 2 of the present invention. The circulation system is comprised of a natural-circulation steam drum 22, which is connected, via a pipe 24 and branch pipes 26 and 28, to the upper ring header 12. A down pipe 30 and branch pipe 32 connect the steam drum 22 to the lower ring header 10. The system circulates with water from the steam drum 22 conveyed by the down pipe 30 to the lower ring header 10 using the force of gravity and passes upwardly from the lower ring header 10 through the tubes 14 by natural convection, as will be described.

It is understood that the separator 2 of the present invention is part of a boiler system including a fluidized bed reactor, or the like (not shown), disposed adjacent to the separator.

In operation, the inlet opening 6a receives a hot gaseous mixture from the reactor which contain gases and entrained fine, solid, fuel particles from the fluidized bed. The inlet opening 6a is configured so as to introduce the hot gaseous mixture into the cylindrical section 6 in a tangential direction. The entrained solid particles are thus propelled, by centrifugal forces, against the inner wall of cylindrical section 6 where the solid particles collect and fall downwardly, due to the force of gravity, into the hopper section 8. The solid particles collected at the bottom of hopper section are directed to external equipment (not shown) for further use by means known in the art. The relatively clean gases remaining in the chamber are prevented from flowing upwardly by the roof section 4 and the connected inner barrel 13, and thus the gases are forced to enter the inner barrel 13 through its lower end. The gases pass through the length of the inner barrel 13 before exiting from the upper end of the inner barrel 13 and are directed to external equipment (not shown) for further use. Water, steam, or a combination thereof, is passed from the steam drum 22, via pipes 30 and 32, into the lower ring header 10, and passes by natural convection upwardly through the tubes 14 of the hopper section 8, the cylindrical section 6 and inlet opening 6a, and the roof section 4. The heated water, steam, or combination thereof, then passes from the roof section 4 into the upper ring header 12 and, via pipes 24, 26, and 28, back into steam drum 22. The circulating fluid thus maintains separator 2 at a relatively low temperature.

Several advantages result from the arrangement of the present invention. For example, the heat losses are reduced, the heat recovery area in the hopper section is increased, and the requirement for internal refractory insulation is minimized.

It is understood that variations in the foregoing can be made within the scope of this invention. For example, the inner barrel 13 can be formed of water-cooled tubes in a manner similar to separator 2 and the inner barrel 13 ca be connected to the flow circuit including the steam drum 22. Also, a forced circulation system can be used instead of the natural circulation system described above in which case a pump 36 would be provided in the line 30 which receives the fluid from the drum 22 and pumps it to and through the branch conduit 32 and the tubes 14.

Figure 4:
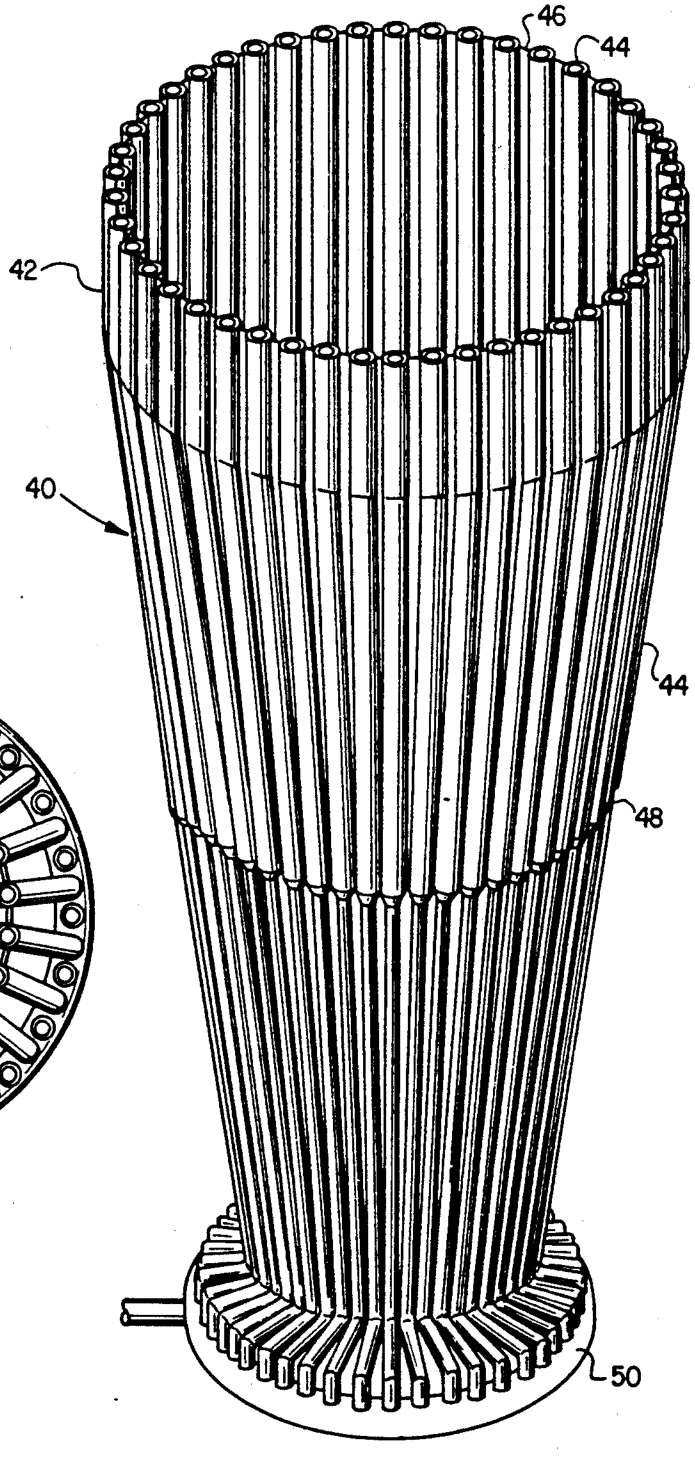
FIG. 4 is a view similar to FIG. 2, but depicting an alternative embodiment of the separator of the present invention.

An alternate embodiment of the separator of the present invention is referred to in general by the reference numeral 40 in FIG. 4. The separator 40 includes a cylindrical section 42 and a conically-shaped lower hopper section 44. The entire separator 40, including the hopper section 44 is formed by a group of continuous, spaced, constant diameter, parallel tubes 46. The tubes 46 are spaced apart by a plurality of fins 48 extending from diametrically opposed portions of each tube for the entire lengths of the tubes and connected to the tube in any conventional manner, such as welding. The width of fins 48 necessarily decreases from top to bottom in the conically-shaped hopper section 44 until adjacent tubes are in direct contact with one another negating the need for a fin. To accommodate the decreasing circumference and diameter of the hopper section 44 and extend the hopper section 44 below the area where the adjacent tubes initially contact, each tube 46 is swaged at or above this area, which is referred to by the reference numeral 50. The reduced diameter segments of the tubes 46 extend the remaining length of the hopper section 44, are then bent radially outwardly at the bottom of the hopper section and are then bent downwardly into the lower ring header 52.

It is understood that the alternate embodiment depicted in FIG. 4 incorporates the sam overall system and method of operation as illustrated in FIG. 1 and explained in the first embodiment, including all variations and modifications.

Several advantages result from the swagging arrangement of the present invention. For example, the heat losses are reduced, the heat recovery area in the hopper section is increased, and the requirement for internal refractory insulation is minimized. These advantages are accomplished without the need to incur the additional cost of an intermediate ring header.

It is understood that variations of the above explained embodiments are contemplated including, but not limited to, multiple extractions or swagings of the tubes to allow greater flexibility in the design parameters.

Modifications, changes, and substitutions are intended in the foregoing disclosure and in some instances some features of the invention will be employed without a corresponding use of other features. Accordingly, is is appropriate that the appended claims be construed broadly in any manner consistent with the scope of the invention.

What is claimed is:

1. A vessel comprising a plurality of tubes arranged in a circular pattern to from a wall, corresponding first portions of said tubes forming a cylinder, corresponding second portions of said tubes being bent inwardly from said first portions to form a conically-shaped hopper section extending below said cylinder, a first portion of said second tube portions extending for the entire length of said hopper section, a second portion of said second tube portions being configured to permit the length of said tubes, and therefore the length of said hopper section, to be increased when compared to said length if said second tube portions were not so configured.

2. The vessel of claim 1 wherein said second portions of said second tube portions are extracted from said wall, so that the lengths of said first tube portions can be greater when compared to said lengths if said second portions were not so extracted.

3. The vessel of claim 1 wherein said second portions of said second tube portions are extracted from said wall at a location intermediate the ends of said second tube portions.

4. The separator of claim 1 wherein adjacent tubes are connected together by a plurality of fins to render said vessel gas-tight.

5. The separator of claim 4 wherein the width of each fin is reduced in a direction from said cylinder to said hopper section until the adjacent second portions of said second tube portions contact.

6. The separator of claim 5 wherein said configuration of said second portion of said second tube portions occurs at the location where each of said latter tube segments contacts its adjacent tube portion.

7. The vessel of claim 1 further comprising an inner cylinder extending within said wall to form an annular chamber, and means for directing gases containing solid particles through said annular chamber for separating the solid particles from said gases by centrifugal forces, the separated gases exiting from said inner cylinder and the separated solids falling into the bottom of said hopper section for disposal or recycle.

8. The vessel of claim 7 further comprising a first ring header connected to the upper ends of said tubes, a second ring header connected to the lower ends of said tubes, and means for passing water, steam, or water and steam mixture through said ring headers to circulate said water, steam, or water and steam mixture through said tubes to cool said wall.

9. The vessel of claim 11 wherein the upper portions of said first tube segments are bent inwardly to form a roof section.

10. A vessel comprising a plurality of tubes arranged in a circular pattern to form a wall, corresponding first portions of said tubes forming a cylinder, corresponding second portions of said tubes being bent inwardly from said first portions to form a conically-shaped section extending below said cylinder, a first portion of said second tube portions extending for the entire length of said hopper section, a second portion of said second tube portions being extracted from said wall so that the lengths of said tubes, and therefore the length of said hopper section, can be greater when compared to said lengths if said second portions were not extracted.

11. The separator of claim 10 wherein adjacent tubes are connected together by a plurality of fins to render said vessel gas-tight.

12. The separator of claim 11 wherein the width of each fin is reduced in a direction from said cylinder to said hopper section until the adjacent second portions of said second tube portions contact.

13. The separator of claim 12 wherein said extraction of said second portion of said second tube portions occurs at the location where each of said latter tube portions contacts its adjacent tube portion.

14. The vessel of claim 10 further comprising an inner cylinder extending within said wall to form an annular chamber, and means for directing gases containing solid particles through said annular chamber for separating the solid particles from said gases by centrifugal forces, the separated gases exiting from said inner cylinder and the separated solids falling into the bottom of said hopper section for disposal or recycle.

15. The vessel of claim 14 further comprising a first ring header connected to the upper ends of said tubes, a second ring header connected to the lower ends of said tubes, and means for passing water, steam, or water and steam mixture through said ring headers to circulate said water, steam, or water and steam mixture through said tubes to cool said wall.

16. The vessel of claim 10 wherein the upper portions of said first tube portions are bent inwardly to form a roof section.

17. A vessel comprising a plurality of tubes arranged in a circular pattern to from a wall, corresponding first portions of said tubes forming a cylinder, corresponding second portions of said tubes being bent inwardly from said first portions to form a conically-shaped hopper section extending below said cylinder, at least a portion of said second tube portions having a reduced diameter when compared to said first tube portions so that said lengths of said tubes, and therefore the length of said hopper section, can be greater when compared to said lengths if said second portion of said second tube segments were not so reduced.

18. The separator of claim 17 wherein adjacent tubes are connected together by a plurality of fins to render said vessel gas-tight.

19. The separator of claim 18 wherein the width of each fin is reduced in a direction from said cylinder to said hopper section until the adjacent portions of said second tube portions contact.

20. The separator of claim 19 wherein said reduction of said second tube portions occurs at the location where each of said latter tube portions contacts its adjacent tube portion.

21. The vessel of claim 17 further comprising an inner cylinder extending within said wall to form an annular chamber, and means for directing gases containing solid particles through said annular chamber for separating the solid particles from said gases by centrifugal forces, the separated gases exiting from said inner cylinder and the separated solids falling into the bottom of said hopper section for disposal or recycle.

22. The vessel of claim 21 further comprising a first ring header connected to the upper ends of said tubes, a second ring header connected to the lower ends of said tubes, and mans for passing water, steam, or water and steam mixture through said ring headers to circulate said water, steam, or water and steam mixture through said tubes to cool said wall.

23. The vessel of claim 17 wherein the upper portions of said first tube portions are bent inwardly to form a roof section.

* * * * *